(12) United States Patent
Numata

(10) Patent No.: US 12,267,595 B2
(45) Date of Patent: Apr. 1, 2025

(54) METHOD AND DEVICE FOR CONTROLLING EXPOSURE LEVEL

(71) Applicant: GUANGDONG OPPO MOBILE TELECOMMUNICATIONS CORP., LTD., Guangdong (CN)

(72) Inventor: Hajime Numata, Yokohama (JP)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 218 days.

(21) Appl. No.: 18/053,574

(22) Filed: Nov. 8, 2022

(65) Prior Publication Data

US 2023/0064826 A1    Mar. 2, 2023

Related U.S. Application Data

(63) Continuation of application No. PCT/CN2020/089275, filed on May 8, 2020.

(51) Int. Cl.
  *H04N 23/73* (2023.01)
  *H04N 23/69* (2023.01)
  *H04N 23/71* (2023.01)

(52) U.S. Cl.
  CPC .......... *H04N 23/73* (2023.01); *H04N 23/69* (2023.01); *H04N 23/71* (2023.01)

(58) Field of Classification Search
  CPC ........ H04N 23/73; H04N 23/69; H04N 23/71; H04N 23/90
  See application file for complete search history.

(56) References Cited

U.S. PATENT DOCUMENTS

| | | |
|---|---|---|
| 2011/0063446 A1 | 3/2011 | McMordie et al. |
| 2012/0281133 A1 | 11/2012 | Kurita et al. |
| 2016/0234444 A1* | 8/2016 | Hosono ................ H04N 23/69 |

FOREIGN PATENT DOCUMENTS

| | | |
|---|---|---|
| CN | 106851122 | 6/2017 |
| CN | 108632511 A | 10/2018 |
| CN | 108737739 A | 11/2018 |
| CN | 110072078 A | 7/2019 |
| CN | 110278378 | 9/2019 |
| CN | 110876023 | 3/2020 |
| WO | 2020051898 | 3/2020 |

OTHER PUBLICATIONS

WIPO, International Search Report and Written Opinion for PCT/CN2020/089275, Feb. 8, 2021.
CNIPA, First Office Action for CN Application No. 202080100617.4, Jul. 8, 2024.

* cited by examiner

Primary Examiner — Yogesh K Aggarwal
(74) Attorney, Agent, or Firm — Hodgson Russ LLP

(57) ABSTRACT

There is provided a method for controlling exposure level for a digitally zoomed image included in a wide angle image First statistics concerning a luminance level in the digitally zoomed image and second statistics concerning a luminance level in the wide angle image are acquired, it is estimated whether an exposure level for the digitally zoomed image should be compensated, by using the first and second statistics, and a target exposure level for the digitally zoomed image is determined based on the estimation result.

20 Claims, 7 Drawing Sheets

WIDE ANGLE IMAGE
FROM WIDE ANGLE CAMERA

TELESCOPIC IMAGE
FROM TELESCOPIC CAMERA

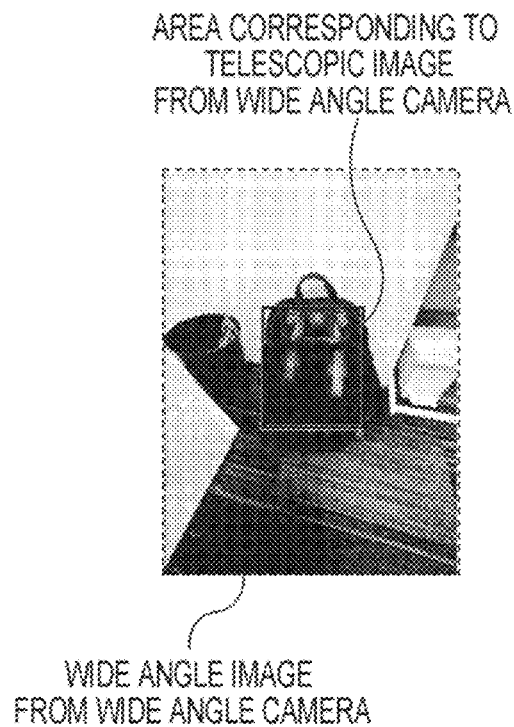

WIDE ANGLE IMAGE
FROM WIDE ANGLE CAMERA
(AREA CORRESPONDING TO TELESCOPIC IMAGE FROM WIDE ANGLE CAMERA)

FIG. 6A

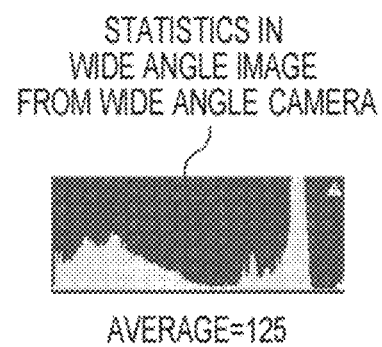

STATISTICS IN WIDE ANGLE IMAGE FROM WIDE ANGLE CAMERA

AVERAGE=125

FIG. 6B

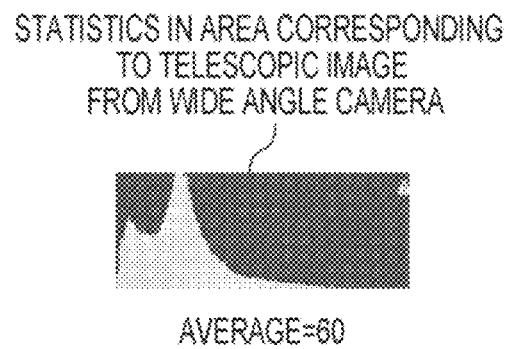

STATISTICS IN AREA CORRESPONDING TO TELESCOPIC IMAGE FROM WIDE ANGLE CAMERA

AVERAGE=60

FIG. 6C

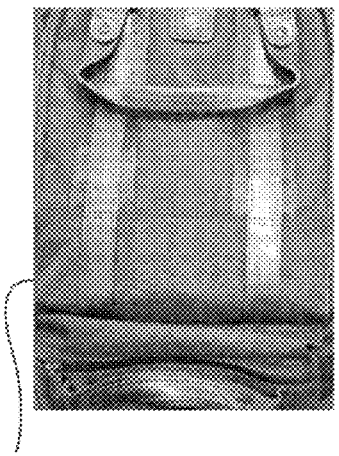

TELESCOPIC IMAGE FROM TELESCOPIC CAMERA

FIG. 7A

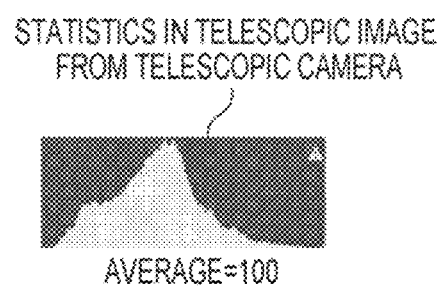

STATISTICS IN TELESCOPIC IMAGE FROM TELESCOPIC CAMERA

AVERAGE=100

FIG. 7B

WIDE ANGLE IMAGE
FROM WIDE ANGLE CAMERA
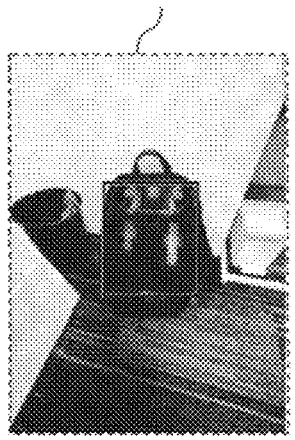
FIG. 8
STATISTICS IN
WIDE ANGLE IMAGE
FROM WIDE ANGLE CAMERA
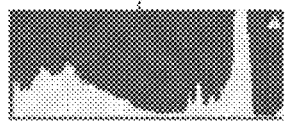
AVERAGE=125
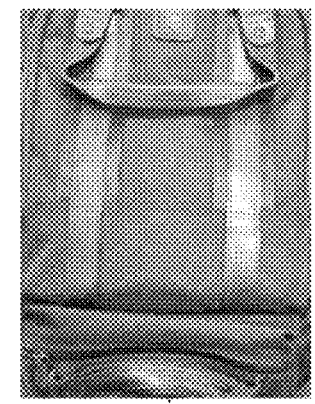
TELESCOPIC IMAGE
FROM TELESCOPIC CAMERA
FIG. 9
STATISTICS IN
TELESCOPIC IMAGE
FROM TELESCOPIC CAMERA
AVERAGE=100
(+) — FINAL STATISTICS
OF TELESCOPIC CAMERA
FIG. 10

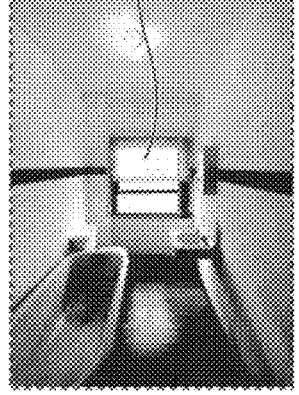

FIG. 11A — AREA CORRESPONDING TO TELESCOPIC IMAGE FROM WIDE ANGLE CAMERA / WIDE ANGLE IMAGE FROM WIDE ANGLE CAMERA

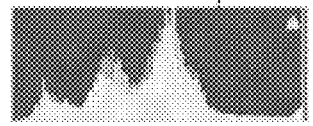

AVERAGE=119

FIG. 11B — STATISTICS IN WIDE ANGLE IMAGE FROM WIDE ANGLE CAMERA

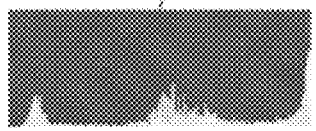

AVERAGE=220

FIG. 11C — STATISTICS IN AREA CORRESPONDING TO TELESCOPIC IMAGE FROM WIDE ANGLE CAMERA

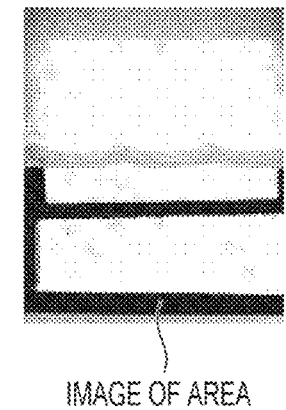

FIG. 12A — IMAGE OF AREA CORRESPONDING TO TELESCOPIC IMAGE FROM WIDE ANGLE CAMERA

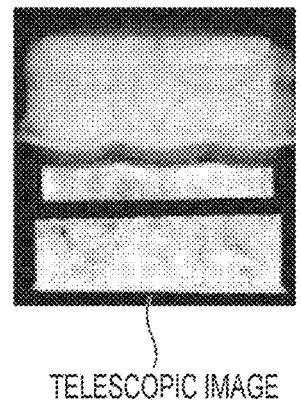

FIG. 12B — TELESCOPIC IMAGE FROM TELESCOPIC CAMERA

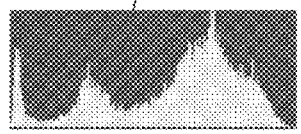

AVERAGE=140

FIG. 12C — STATISTICS IN TELESCOPIC IMAGE FROM TELESCOPIC CAMERA

METHOD AND DEVICE FOR CONTROLLING EXPOSURE LEVEL

CROSS-REFERENCE TO RELATED APPLICATION(S)

This application is a continuation of International Application PCT/CN2020/089275, filed May 8, 2020, the entire disclosure of which is incorporated herein by reference.

TECHNICAL FIELD

The present disclosure relates to the image processing technology field in general, and more specifically, to a method and a device for controlling an exposure level.

BACKGROUND

In recent years, color imaging apparatuses have been developed and widely used in devices such as mobile phones, digital cameras, etc. The exposure level of color imaging apparatuses is controlled based on statistics from images which the camera views.

As a device known to the inventor, a color imaging device may have one camera unit having a digital zoom function, or two or more camera units, one of them being a wide angle camera, and another being a telescopic camera. The inventor recognizes that a digital zoom camera or a telescopic camera can see only a small area, e.g., an area occupied by an object, so that the camera cannot appropriately control the exposure level and properly display the color of the object.

SUMMARY

The present disclosure provides a method and a device for appropriately controlling an exposure level Some embodiments of the disclosure provide a method for controlling an exposure level for a digitally zoomed image included in a wide angle image, the method including:
  acquiring first statistics concerning a luminance level in the digitally zoomed image and second statistics concerning a luminance level in the wide angle image;
  estimating whether an exposure level for the digitally zoomed image should be compensated, by using the first and second statistics; and
  determining a target exposure level for the digitally zoomed image based on the estimation result.

Some embodiments of the disclosure provide a method for controlling an exposure level for a telescopic image from a telescopic camera, the method including:
  acquiring first statistics concerning a luminance level in an area, corresponding to the telescopic image, included in a wide angle image, and second statistics concerning a luminance level in the wide angle image;
  estimating whether an exposure level for the telescopic image should be compensated, by using the first and second statistics; and
  determining a target exposure level for the telescopic image based on the estimation result.

Some embodiments of the disclosure provide a device for controlling an exposure level, including:
  at least one camera unit having a zoom function, configured to acquire a zoomed image and a wide angle image, where the at least one camera is further configured to acquire first statistics concerning a luminance level in the wide angle image, second statistics concerning a luminance level in an area, corresponding to the zoomed image, included in the wide angle image, and third statistics concerning a luminance level in the zoomed image; and
  a CPU, configured to determine a final exposure level for the zoomed image based on the first statistics and the second statistics.

BRIEF DESCRIPTION OF THE DRAWINGS

These and/or other aspects and advantages of embodiments of the present disclosure will become apparent and more readily appreciated from the following descriptions made with reference to the drawings, in which:

FIG. 6A illustrates an image captured by a wide angle camera, including both a black object and bright objects;

FIG. 6B illustrates an explanatory graph showing statistics regarding a relationship between luminance levels and number of pixels having respective luminance levels in the image from the wide angle camera;

FIG. 6C illustrates an explanatory graph showing statistics regarding a relationship between luminance levels and number of pixels having respective luminance levels in an area, including only a black object, included in the image from the wide angle camera;

FIG. 7A illustrates an image captured by a digital zoom camera or a telescopic camera, including a black object only;

FIG. 7B illustrates an explanatory graph showing statistics regarding a relationship between luminance levels and number of pixels having respective luminance levels in the image from the digital zoom camera or the telescopic camera;

FIG. 8 illustrates an image captured by a wide angle camera, including both a black object and other bright objects;

FIG. 9 illustrates an image captured by a digital zoom camera or a telescopic camera, including only a black object;

FIG. 10 shows that 'final statistics of a telescopic camera' is equal to 'statistics from a wide angle camera' plus 'statistics from a digital zoom camera or a telescopic camera';

FIG. 11A illustrates an image captured by a wide angle camera, including both a bright object (for example, the outside of a window) and other dark objects (for example, the inside of a room);

FIG. 11B illustrates an explanatory graph showing statistics regarding a relationship between luminance levels and number of pixels having respective luminance levels in the image from a wide angle camera;

FIG. 11C illustrates an explanatory graph showing statistics regarding a relationship between luminance levels and number of pixels having respective luminance levels in an area corresponding to a telescopic image from a wide angle camera;

FIG. 12A illustrates an image of an area including only a bright object, from a wide angle camera;

FIG. 12B illustrates an image captured by a digital zoom camera or a telescopic camera, including only a bright object;

FIG. 12C illustrates an explanatory graph showing statistics regarding a relationship between luminance levels and number of pixels having respective luminance levels in the image including only a bright object (for example, the outside of a window) shown in FIG. 12B;

DETAILED DESCRIPTION

Figure 1A:
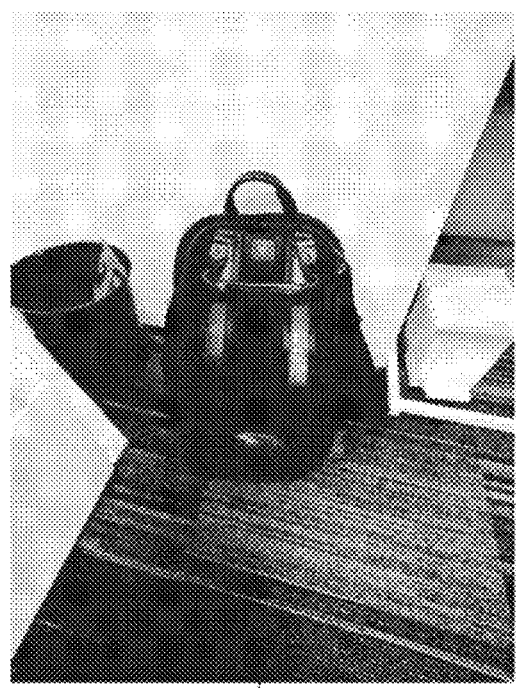
FIG. 1A illustrates an image captured by a wide angle camera, including both a black object and other bright objects.

Embodiments of the present disclosure will be described in detail and examples of the embodiments will be illustrated in the accompanying drawings. The same or similar elements, and elements having same or similar functions, are denoted by like reference numerals throughout the descriptions. The embodiments described herein with reference to the drawings are explanatory and aim to illustrate the present disclosure but shall not be construed to limit the present disclosure.

When the color imaging apparatus has one camera unit, the camera may capture a wide angle image including both a black object and other bright objects, and may capture a digitally zoomed image of the black object only. When the color imaging apparatus has two or more cameras, one camera may capture a wide angle image including both the black object and the other bright objects, and another camera may capture a telescopic image of the black object only.

The wide angle camera can see not only the black object (for example, luminance level=60, between 0 to 255) but also the bright objects (for example, full luminance level=125), thus the wide angle camera can determine that the object is black and the shooting condition is not dark. The color imaging apparatus can appropriately control the exposure level and the camera unit displays the "black" object (luminance level=60).

In contrast, a digital zoom camera or a telescopic camera can see only the black object. The camera cannot determine whether the object is black or the shooting condition is dark.

As a result, the color imaging apparatus cannot appropriately control the exposure level and changes the exposure level from the actual level (luminance level=60) to a brighter level (luminance level=120). The camera unit does not display a "black" object, but an almost "grey" object.

As another example, when the color imaging apparatus has one camera unit (wide angle camera), this wide angle camera may capture an image including a white object (luminance level=216) with other dark objects (full luminance level=170), and may capture a digitally zoomed image of the white object only. When the color imaging apparatus has two or more camera units, one camera may capture a wide angle image including the white object with the other dark objects, and another camera may capture a telescopic image of the white object only.

As the wide angle camera can see both the white object and the other dark objects, the color imaging apparatus can determine that the object is white, and the shooting condition is not bright. The color imaging apparatus can appropriately control the exposure level and the camera unit appropriately displays the "white" object (luminance level=216).

On the contrary, the digital zoom camera or the telescopic camera can see only the white object. The color imaging apparatus cannot determine whether the object is white, or the shooting condition is bright.

As a result, the color imaging apparatus cannot appropriately control the exposure level and changes the exposure level from the actual level (luminance level=170) to a brighter level (luminance level=216). The camera unit does not display a "white" object (luminance level=216), but an almost "grey" object (luminance level=170).

Figure 1B:
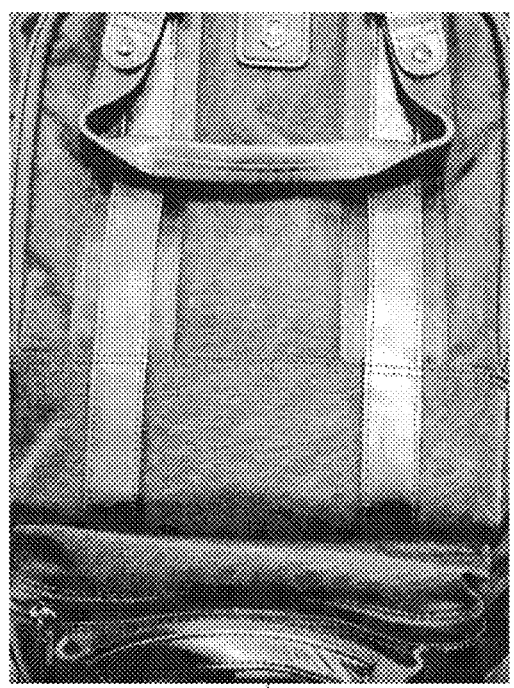
FIG. 1B illustrates an image captured by a digital zoom camera or a telescopic camera, including the black object only.

As explained above, a camera unit of a conventional color imaging system, as a comparative example, may capture a wide angle image including both a black object and other bright objects as shown in FIG. 1A, and may capture a digitally zoomed image in the wide angle image including only the black object or may capture a telescopic image in a telescopic camera including only the black object as shown in FIG. 1B.

As the digital zoom camera or the telescopic camera can see only the black object, the camera cannot determine whether the object is black or the shooting condition is dark. Thus the color imaging apparatus cannot appropriately control an exposure level and changes the exposure level from the actual level to a brighter level. The conventional camera's AE function decides the exposure level of the digitally zoomed image or the telescopic image based on information from the digitally zoomed image or the telescopic image only.

The above problem can be solved by using information of an image from the wide angle camera since the wide angle camera is seeing more information, not only the black object, but also other bright objects indicating the shooting condition.

Using the information of the image from the wide angle camera, the method and the apparatus for controlling an exposure level, and the computer usable medium storing software for implementing the method, described in the following embodiments of the present disclosure, overcome the above problem.

The embodiments of the disclosure provides a method for controlling an exposure level for a digitally zoomed image included in a wide angle image, the method includes:
   acquiring first statistics concerning a luminance level in the digitally zoomed image and second statistics concerning a luminance level in the wide angle image;
   estimating whether an exposure level for the digitally zoomed image should be compensated, by using the first and second statistics; and
   determining a final exposure level (also referred to as a target exposure level) for the digitally zoomed image based on the estimation result.

In some embodiments, when estimating whether an exposure level for the digitally zoomed image should be compensated, whether an object in the digitally zoomed image is black or a shooting condition is dark, or the object is white or the shooting condition is bright, may be estimated by using the first and second statistics.

In some embodiments, it is determined that the exposure level for the digitally zoomed image should be compensated, in response to determining that the object is black and the shooting condition is not dark, or determining that the object is white and the shooting condition is not bright.

In some embodiments, when estimating whether the exposure level for the digitally zoomed image should be compensated, an exposure level difference between the second statistics and a third statistics concerning a luminance level in an area, corresponding to the digitally zoomed image, included in the wide angle image is calculated, and it may be determined that the exposure level for the digitally zoomed image should be compensated when the exposure level difference is lower than a predetermined value.

In some embodiments, when determining that the exposure level for the digitally zoomed image should be compensated, the determining a final exposure level for the digitally zoomed image based on the estimation result includes operations as follows. A blend ratio based on the exposure level difference is determined, and an exposure level indicated by the first statistics is blended with an exposure level indicated by the second statistics by using the blend ratio to thereby acquire the final exposure level.

In some embodiments, in response to determining the exposure level for the digitally zoomed image should be compensated, the final exposure level for the digitally zoomed image is determined based on blending an exposure level indicated by the first statistics with an exposure level indicated by the second statistics by using the following equation:

$$Exposure\_zoomed\_final = Exposure\_wide \times Blend\_ratio + Exposure\_zoomed \times (1 - Blend\_ratio)$$

where
Exposure_zoomed_final is the final exposure level for the digitally zoomed image;
Exposure_wide is the exposure level for the wide angle image;
Exposure_zoomed is the exposure level for the digitally zoomed image; and
Blend_ratio is the blend ratio.

The embodiments of the disclosure provides a method for controlling an exposure level for a telescopic image from a telescopic camera. The method includes:
acquiring first statistics concerning a luminance level in an area, corresponding to the telescopic image, included in a wide angle image, and second statistics concerning a luminance level in the wide angle image;
estimating whether an exposure level for the telescopic image should be compensated, by using the first and second statistics; and
determining a final exposure level for the telescopic image based on the estimation result.

In some embodiments, when estimating whether the exposure level for the telescopic image should be compensated, whether an object is black or a shooting condition is dark, or the object is white or the shooting condition is bright, may be estimated by using the first and second statistics.

In some embodiments, it is determined that the exposure level for the telescopic image should be compensated, in response to determining the object is black and the shooting condition is not dark, or the object is white and the shooting condition is not bright.

In some embodiments, when estimating whether the exposure level for the telescopic image should be compensated, an exposure level difference between the first statistics and the second statistics is calculated, and it may be determined that the exposure level for the telescopic image should be compensated when the exposure level difference is lower than a predetermined value.

In some embodiments, the operation of determining a final exposure level for the telescopic image based on the estimation result includes operations as follows. A blend ratio is determined based on the exposure level difference, a third statistics concerning a luminance level in the telescopic image is acquired and an exposure level indicated by the first statistics is blended with an exposure level indicated by the third statistics by using the blend ratio to thereby determine the final exposure level.

In some embodiments, the blend ratio is a preset value which is greater than 0 and equal to or smaller than 1 when the exposure level difference is smaller than a predetermined threshold, where the predetermined threshold is less than the predetermined value. The blend ratio is a value which is smaller than the preset value and greater than 0 and decreases with the increasing exposure level difference, when the exposure level difference is equal to or greater than the predetermined threshold and smaller than the predetermined value.

In some embodiments, when deciding that the exposure level for the telescopic image should be compensated, a third statistics concerning a luminance level in the telescopic image, in response to determining that the exposure level for the telescopic image should be compensated, the final exposure level for the telescopic image based on blending an exposure level indicated by the first statistics with an exposure level indicated by the third statistics by using the following equation:

$$Exposure\_telescopic\_final = Exposure\_wide \times Blend\_ratio + Exposure\_telescopic \times (1 - Blend\_ratio)$$

where
Exposure_telescopic_final is the final exposure level for the telescopic image;
Exposure_wide is the exposure level for the wide angle image;
Exposure_telescopic is the exposure level for the telescopic image; and
Blend_ratio is the blend ratio.

The embodiments of the disclosure provide a device for controlling an exposure level for a digitally zoomed image included in a wide angle image, the device includes at least one camera unit and a CPU. The at least one camera unit has a digital zoom function, and is configured to acquire first statistics concerning a luminance level in the digitally zoomed image and second statistics concerning a luminance level in the wide angle image. The CPU configured to input the first and second statistics, to estimate whether an exposure level for the digitally zoomed image should be compensated, by using the first and second statistics, and to decide a final exposure level for the digitally zoomed image based on the estimation result.

The embodiments of the disclosure provide a computer usable medium storing software for causing a computer to implement a method for controlling an exposure level for a digitally zoomed image included in a wide angle image, the method including:
acquiring first statistics concerning a luminance level in the digitally zoomed image, and second statistics concerning a luminance level in the wide angle image;

estimating whether an exposure level for the digitally zoomed image should be compensated, by using the statistics; and deciding a final exposure level for the digitally zoomed image based on the estimation result.

The embodiments of the disclosure provide a computer usable medium storing software for causing a computer to implement a method for controlling an exposure level for a telescopic image from a telescopic camera, the method including:

acquiring first statistics concerning a luminance level in an area, corresponding to the telescopic image, included in a wide angle image, and second statistics concerning a luminance level in the wide angle image;

estimating whether an exposure level for the telescopic image should be compensated, by using the first and second statistics; and deciding a final exposure level for the telescopic image based on the estimation result.

The embodiments of the disclosure provides a device for controlling an exposure level. The device includes at least one camera unit having a zoom function and a CPU. The at least one camera unit is configured to acquire a zoomed image and a wide angle image, where the at least one camera is further configured to acquire first statistics concerning a luminance level in the wide angle image, second statistics concerning a luminance level in an area, corresponding to the zoomed image, included in the wide angle image, and third statistics concerning a luminance level in the zoomed image. The CPU is configured to determine a final exposure level for the zoomed image based on the first statistics and the second statistics.

In some embodiments, the at least one camera unit includes a wide angle camera having a digital zoom function, the wide angle camera is configured to perform the digital zoom function to thereby obtain the zoomed image.

In some embodiments, the at least one camera unit includes a wide angle camera and a telescopic camera having an optical zoom function, the wide angle camera is configured to acquire the wide angle image, the first statistics and the second statistics, and the telescopic camera is configured to perform the optical zoom function to thereby obtain the zoomed image and the third statistics.

In some embodiments, the CPU is configured to:
estimate, by using the first statistics and the second statistics, whether an object in the zoomed image is black or a shooting condition is dark, or the object is white or the shooting condition is bright; and
determine that the exposure level for the zoomed image should be compensated, in response to determining the object is black and the shooting condition is not dark, or the object is white and the shooting condition is not bright.

In some embodiments, the CPU is configured to:
calculate an exposure level difference between an exposure level indicated by the first statistics and an exposure level indicated by the second statistics; and
determine a blend ratio having a value which varies depending on the exposure level difference;
blend, in response to the exposure level difference is lower than a predetermined value, an exposure level indicated by the first statistic and an exposure level indicated by the third statistic with the blend ratio to thereby determine the final exposure level for the zoomed image.

In some embodiments, the CPU is configured to:
blend the exposure level indicated by the first statistic and the exposure level indicated by the third statistic with the blend ratio by using the following equation:

Exposure_zoomed_final=Exposure_wide×Blend_ratio+Exposure_zoomed×(1−Blend_ratio)

where Exposure_zoomed_final is the final exposure level for the zoomed image;
Exposure_wide is the exposure level for the wide angle image;
Exposure_zoomed is the exposure level for the zoomed image; and
Blend_ratio is the blend ratio.

Figure 2:
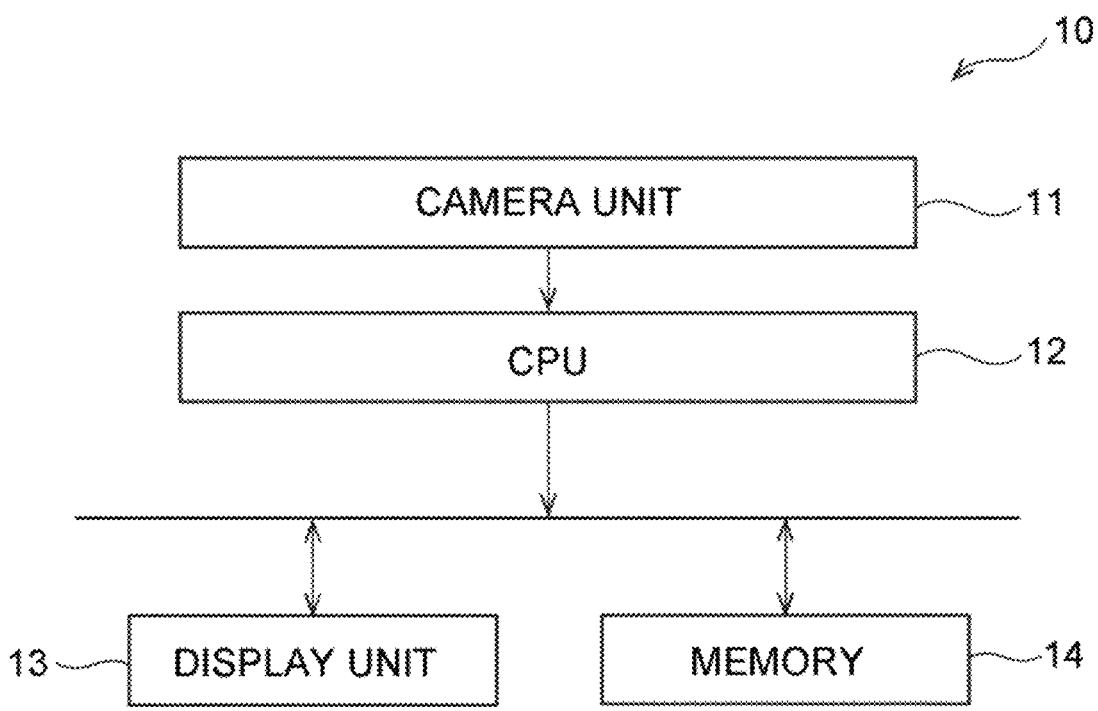
FIG. 2 is a block diagram schematically showing a circuit configuration of an apparatus for controlling an exposure level including one camera unit according to a first embodiment of the present disclosure.

Referring to FIG. 2, an device 10 for controlling an exposure level according to a first embodiment of the present disclosure includes at least one camera unit 11, a CPU (central processing unit) 12, a display unit 13 and a memory 14.

The camera unit 11 is set to wide angle, and has a digital zoom function. The camera unit 11 captures a wide angle image, and outputs an image data and its statistics. The image captured by the camera unit 11 may include a still image or a moving image. The statistics may be, for example, data concerning luminance levels, the relationship between luminance levels and number of pixels having respective luminance levels, or an average value of luminance levels of all pixels.

The CPU 12 inputs the image data and the statistics, and determines whether the digital zoom function of the camera unit 11 is used.

If it is used, the CPU 12 estimates whether an object included in the digitally zoomed image is black or the shooting condition is dark, or the object is white or the shooting condition is bright, by using the statistics.

More specifically, as explained below, the CPU 12 estimates the above based on the exposure level difference between statistics of a wide angle image, and statistics of the digitally zoomed image.

When the CPU 12 estimates that the object included in the digitally zoomed image is black/white and the shooting condition is not dark/bright, the CPU 12 compensates the exposure level of the digitally zoomed image using the statistics of the wide angle image.

When the CPU 12 estimates that the object included in the digitally zoomed image is not black/white and the shooting condition is dark/bright, the CPU 12 does not compensate the exposure level of the digitally zoomed image.

The CPU 12 outputs the image data and the exposure control signal regarding the exposure level of the digitally zoomed image.

The display unit 13 inputs the image data and the exposure control signal regarding the exposure level for the digitally zoomed image, and displays the digitally zoomed image using the exposure control signal.

The memory 14 inputs or outputs data from or to the CPU 12, or inputs or outputs data from or to the display unit 13.

Figure 3:
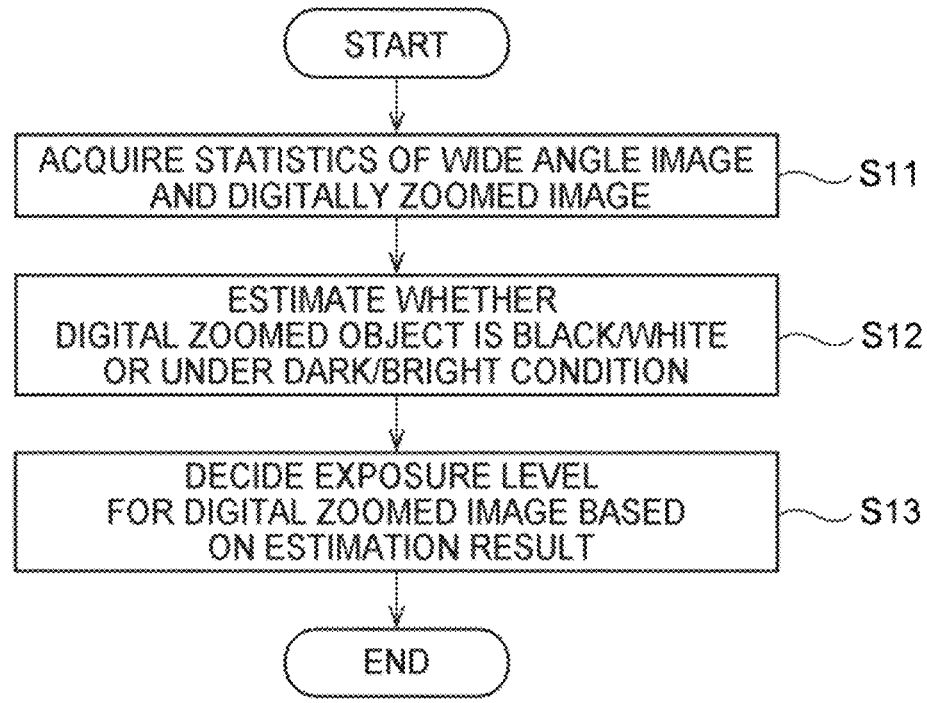
FIG. 3 is a flowchart illustrating a method for controlling an exposure level using one camera unit according to a second embodiment of the present disclosure.

A method for controlling an exposure level according to a second embodiment of the present disclosure includes the following steps shown in the flowchart of FIG. 3.

In the step S11, when a wide angle image and a digitally zoomed image included in the wide angle image are captured, statistics of the wide angle image and the digitally zoomed image are acquired.

In the step S12, it is estimated whether an object included in the digitally zoomed image is black/white, or the shooting condition is dark/bright.

More specifically, the above estimation is based on the exposure level difference between statistics of the wide angle image, and statistics of the digitally zoomed image.

When it is estimated that the object included in the digitally zoomed image is black/white and the shooting condition is not dark/bright, the exposure level of the digitally zoomed image is compensated by using the statistics of the wide angle image.

When it is estimated that the object included in the digitally zoomed image is not black/white and the shooting condition is dark/bright, the luminance level of the digitally zoomed image is not compensated.

In the step S13, a final exposure level (also referred to as target exposure level) for the digitally zoomed image is decided based on the estimation result.

Figure 4:
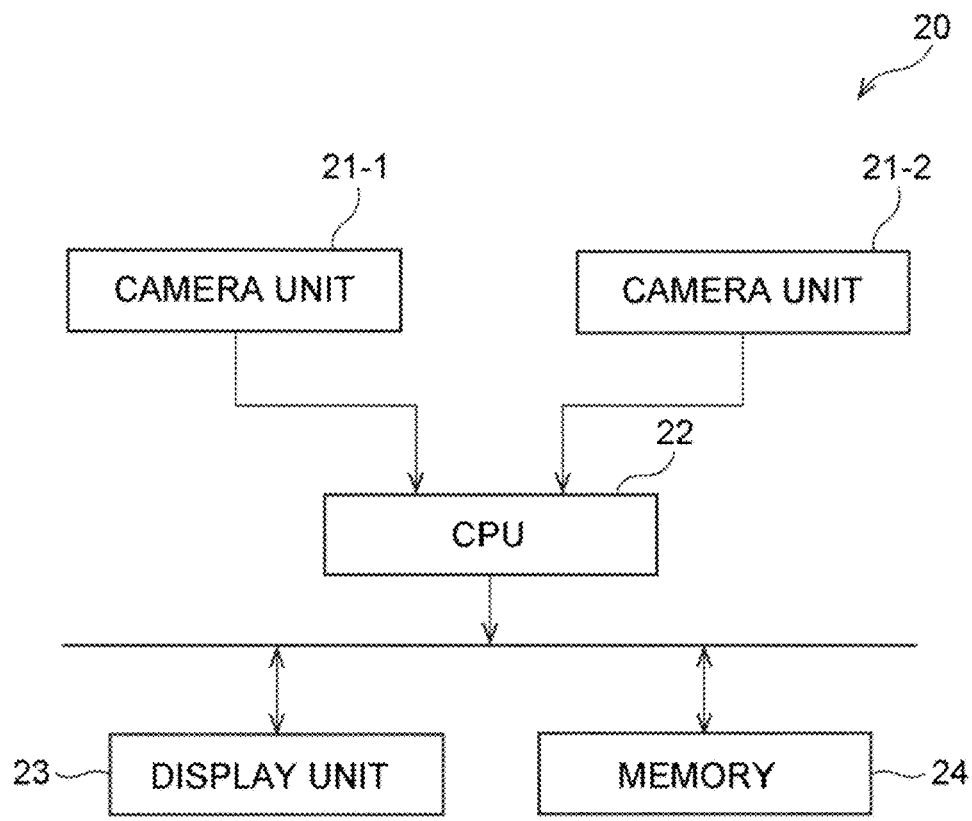
FIG. 4 is a block diagram schematically showing a circuit configuration of an apparatus for controlling an exposure level including two or more camera units according to a third embodiment of the present disclosure.

Referring to FIG. 4, an device 20 for controlling an exposure level according to a third embodiment of the present disclosure includes at least two camera units, namely a camera unit 21-1 and a camera unit 21-2, a CPU 22, a display unit 23 and a memory 24.

The camera unit 21-1 is set to wide angle, and the camera unit 21-2 is set to telescopic. The camera unit 21-1 captures a wide angle image, and outputs image data and its statistics. The camera unit 21-2 captures a telescopic image, and outputs image data and its statistics. The image captured by the camera unit 21-1 may include a still image or a moving image, and the image captured by the camera unit 21-2 may include a still image or a moving image.

The CPU 22 estimates whether an object included in the telescopic image is black/white, or under dark/bright shooting condition, by using the statistics.

More specifically, the CPU estimates the above based on the exposure level difference between statistics of the wide angle image, and statistics of an area, corresponding to the telescopic image, included in the wide angle image.

When the CPU 22 estimates that the object included in the digitally zoomed image is black/white and the shooting condition is not dark/bright, the CPU 22 compensates the exposure level of the telescopic image by using the statistics of the wide angle image.

When the CPU 22 estimates that the object included in the digitally zoomed image is not black/white and the shooting condition is dark/bright, the CPU 12 does not compensate the exposure level of the telescopic image.

The CPU 22 outputs the image data and an exposure control signal regarding the luminance level of the telescopic image.

The display unit 23 inputs the image data and the exposure control signal, and displays the telescopic image by using the exposure control signal.

The memory 24 inputs or outputs data from or to the CPU 22, or input or outputs data from or to the display unit 23.

Figure 5:
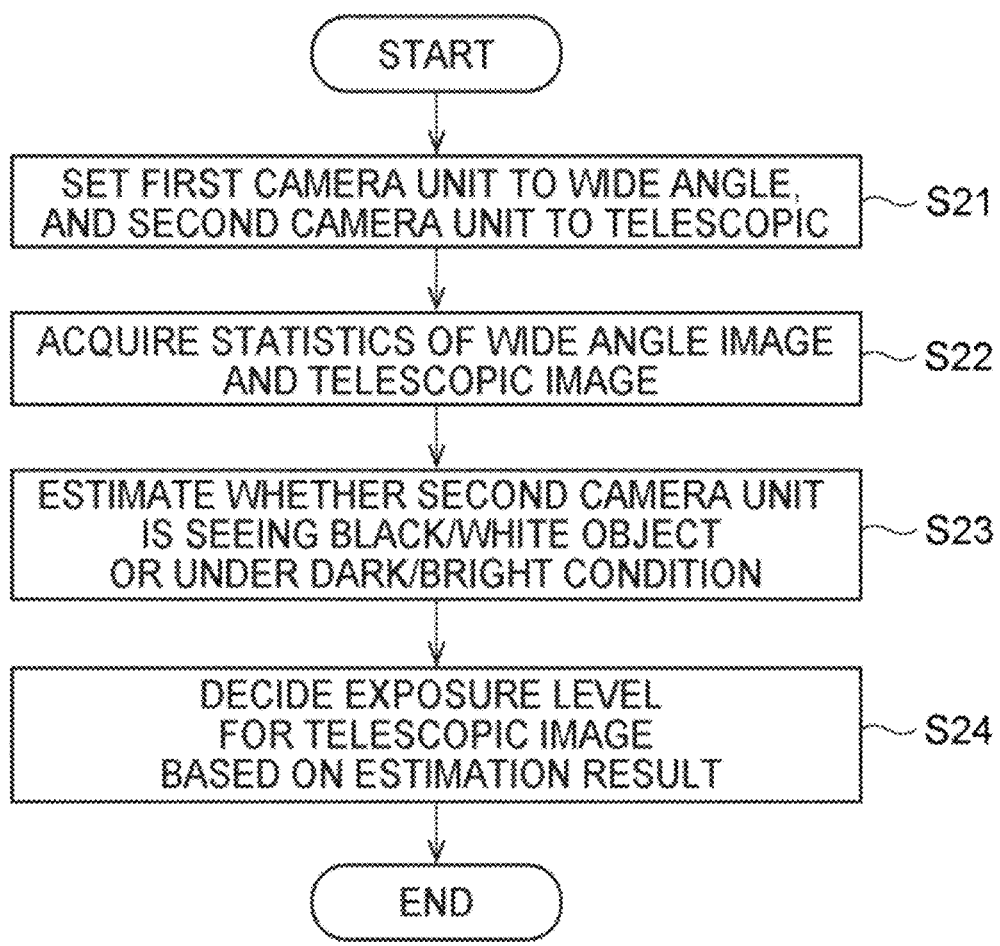
FIG. 5 is a flowchart illustrating a method for controlling an exposure level using two or more camera units according to a fourth embodiment of the present disclosure.

A method for controlling an exposure level according to a fourth embodiment of the present disclosure includes the following steps shown in the flowchart of FIG. 5.

In the step S21, at least one camera (first camera) is set to wide angle, and at least one camera (second camera) is set to telescopic.

In the step S22, statistics of the wide angle image from the wide angle camera (first camera), and statistics of an area, corresponding to a telescopic image, included in the wide angle image are acquired.

In the step S23, it is estimated whether an object included in the telescopic image is black/white, or under dark/bright condition by using the statistics.

More specifically, the above estimation is based on the exposure level difference between statistics of whole wide angle image, and statistics of an area, corresponding to the telescopic image, included in the wide angle image.

When it is estimated that the object is black/white and the shooting condition is not dark/bright, the exposure level of the telescopic image from the telescopic camera is compensated by using the statistics of the whole wide angle image.

When it is estimated that the object is not black/white and the shooting condition is dark/bright, the luminance level of the digitally zoomed image is not compensated.

In the step S24, a final exposure level (also referred to as target exposure level) for the telescopic image is decided based on the estimation result.

The manner of controlling the exposure level of digitally zoomed image or telescopic image is explained below.

FIG. 6A shows a wide angle image captured by a wide angle camera (the camera unit 11 or the camera unit 21-1). The wide angle camera is seeing both a black object and other bright objects.

FIG. 6B is an explanatory graph showing statistics (average=125), namely, a relationship between luminance levels and number of pixels having respective luminance levels in the wide angle image from the wide angle camera, and FIG. 6C is an explanatory graph showing statistics (average=60), specifically, a relationship between luminance levels and number of pixels having respective luminance levels in the area, corresponding to the digitally zoomed image, from the wide angle camera (the camera unit 11) or the area, corresponding to the telescopic image, from the wide angle camera (the camera unit 21-1).

FIG. 7A shows a digitally zoomed image (also referred to as a zoomed image) captured by the wide angle camera (the camera unit 11), or a telescopic image captured by the telescopic camera (the camera unit 21-2). It can be understood that the zoomed image may be one of the digitally zoomed image and the telescopic image, the wide angle camera is configured to perform a digital zoom function to obtain the digitally zoomed image, and the telescopic camera is configured to perform an optical zoom function to obtain the digitally zoomed image. The digitally zoomed image or the telescopic image includes only the black object. FIG. 7B shows an explanatory graph showing statistics (average=100), a relationship between luminance levels and number of pixels having respective luminance levels in the digitally zoomed image from the wide angle camera (the camera unit 11) or the telescopic image from the telescopic camera (the camera unit 21-2).

The CPU 12 or 22 can estimate whether the object included in the digitally zoomed image or the telescopic image is black, or the shooting condition is dark, by using the statistics of the wide angle image shown in FIG. 6B and the statistics of the area, corresponding to the digitally zoomed image, from the wide angle camera or the statistics of the area, corresponding to the telescopic image, from the telescopic camera shown in FIG. 6C.

If the exposure level difference between the exposure level indicated by the statistics of the wide angle image shown in FIG. 6B and the exposure level indicated by the statistics of the area corresponding to the digitally zoomed image from the wide angle camera or the area corresponding to the telescopic image from the telescopic camera shown in FIG. 6C is lower than a predetermined value, the exposure level (average=100) of the digitally zoomed image from the wide angle camera or the telescopic image from the telescopic camera is compensated by being added the statistics (average=125) of the whole wide angle image from the wide angle camera, by using a blend ratio, as indicated by FIG. 10.

For another example, referring to FIG. 11A, the wide angle image captured by a wide angle camera (the camera unit 11 or the camera unit 21-1) may include both a bright object (for example, the outside of a window) and other dark objects (for example, the inside of a room).

FIG. 11B shows an explanatory graph showing statistics of the whole wide angle image from the wide angle camera.

FIG. 11C illustrates an explanatory graph showing statistics of an area corresponding to a telescopic image from the wide angle camera or an area corresponding to a digitally zoomed image from the wide angle camera.

FIG. 12A shows an area, corresponding to a digitally zoomed image, showing only the bright object from the wide angle camera (the camera unit 11), or an area, corresponding to a telescopic image, showing only the bright object from the wide angle camera (the camera unit 21-1). The image (average=220) shown in FIG. 12A is too bright, thus almost nothing can be seen.

FIG. 12B shows the digitally zoomed image showing only the bright object from the wide angle camera (the camera unit 11), or the telescopic image showing only the bright object from the telescopic camera (the camera unit 21-2). The exposure level of the digitally zoomed image or the telescopic image (average=140) is appropriate, thus details are visible in the image of FIG. 12B.

FIG. 12C shows an explanatory graph showing statistics of the digitally zoomed image from the wide angle camera (the camera unit 11) or the telescopic image from the telescopic camera (the camera unit 21-2).

The CPU 12 or 22 can estimate whether the object included in the digitally zoomed image or the telescopic image is too bright, or the shooting condition is too bright, by using the statistics of the wide angle image shown in FIG. 11B and the statistics of the area, corresponding to the digitally zoomed image, from the wide angle camera or the area, corresponding to the telescopic image, from the wide angle camera shown in FIG. 11C.

If the exposure level difference between the exposure level indicated by the statistics of the wide angle image shown in FIG. 11B and the exposure level indicated by the statistics of the area, corresponding to the digitally zoomed image, from the wide angle camera or the area, corresponding to the telescopic image, from the wide angle camera shown in FIG. 11C, is equal to or greater than a predetermined value, the exposure level (average=145) of the digitally zoomed image from the wide angle camera or the telescopic image from the telescopic camera is not compensated as explained in detail below.

Figure 13:
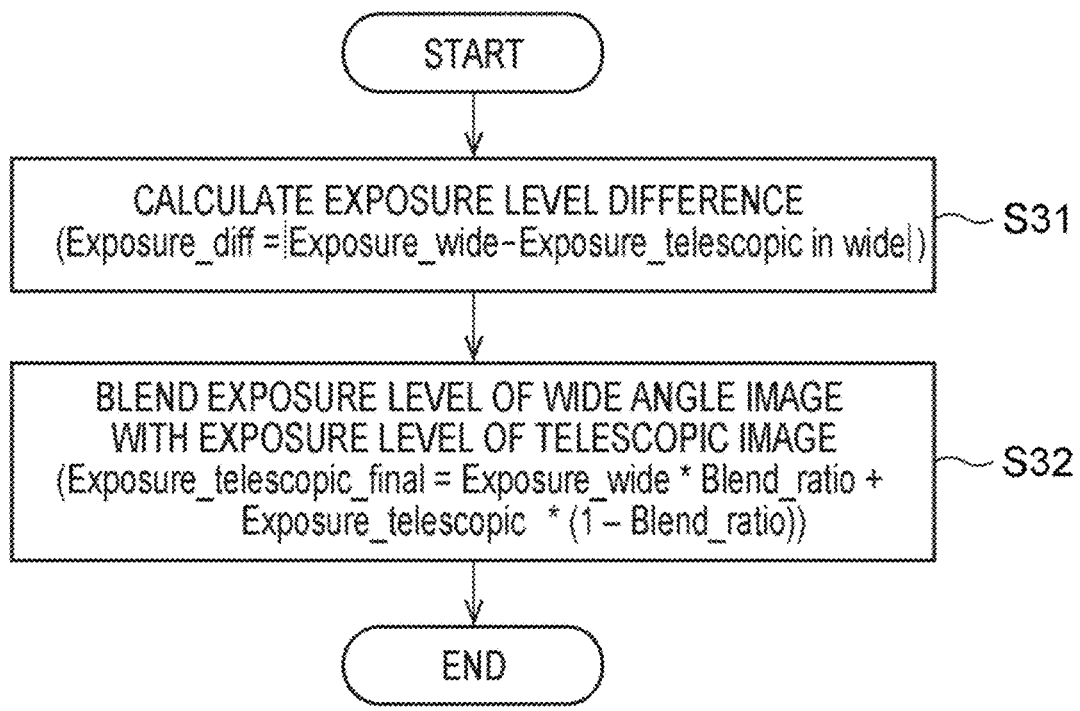
FIG. 13 shows a flowchart illustrating a method for compensating an exposure level of a digitally zoomed image or a telescopic image.

The compensation of the exposure level for the digitally zoomed image or the telescopic image is as follows, referring to a flowchart of FIG. 13.

In the step S31, an exposure level difference (Exposure_diff) is calculated, namely, the exposure level difference (Exposure_diff) equals an absolute value of an exposure level (Exposure_wide) in a wide angle image minus an exposure level (Exposure_telescopic in wide) in an area, corresponding to a digitally zoomed image, in a wide angle camera, or an area, corresponding to a telescopic image, in the wide angle camera, as indicated by the following equation:

$$\text{Exposure\_diff} = |\text{Exposure\_wide} - \text{Exposure\_telescopic in wide}|$$

Figure 14:
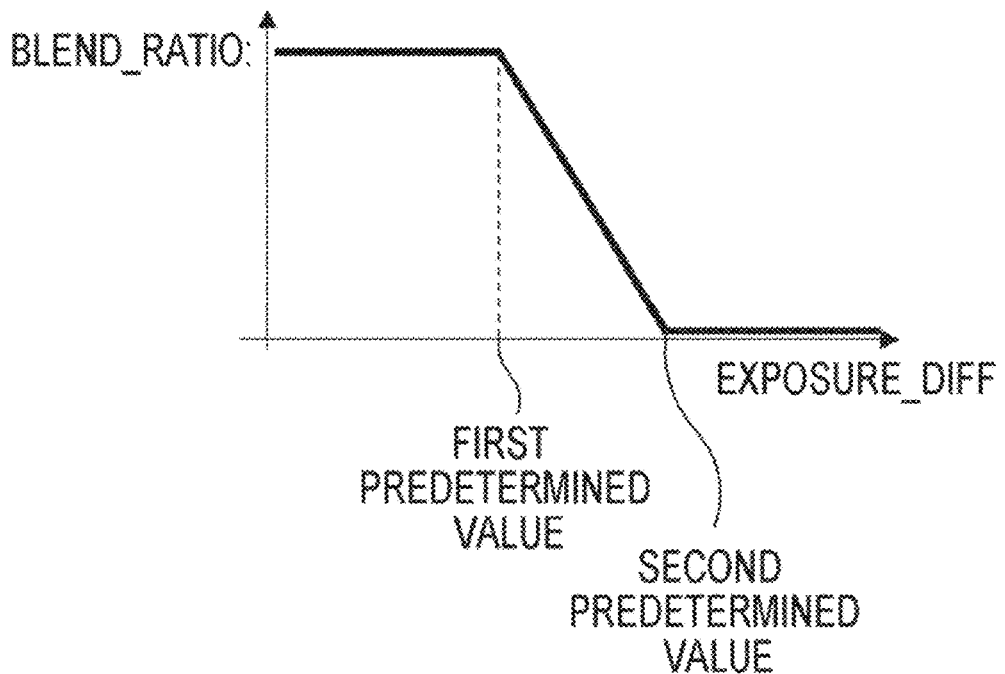
FIG. 14 shows an explanatory graph indicating a relationship between a blend ratio and an exposure level difference between an exposure level of a wide angle camera and an exposure level of an area corresponding to a digitally zoomed image or an area corresponding to a telescopic image in a wide angle camera.

The blend ratio (Blend_ratio) is determined based on the exposure level difference (Exposure_diff), as indicated in FIG. 14.

When the exposure level difference is smaller than a first predetermined value, the blend ratio is greater than "0" and equal to or smaller than "1". The blend ratio may be a preset value.

When the exposure level difference is between the first predetermined value (also referred to a predetermined threshold) and a second predetermined value (also referred to a predetermined value), the blend ratio becomes smaller. In some implementations, the blend ratio is smaller than the preset value and greater than 0 and decreases with the increasing exposure level difference, when the exposure level difference is equal to or greater than the predetermined threshold and smaller than the predetermined value.

When the exposure level difference is equal to or greater than the second predetermined value, the blend ratio is "0".

As the step S32, an exposure level (exposure_telescopic_final) of the digitally zoomed image or the telescopic image is obtained by blending the exposure level of the wide angle image (Exposure_wide) from the wide angle camera with the exposure level (Exposure_telescopic in the digitally zoomed image from the wide angle camera or in the telescopic image from the telescopic camera, by using the blend ratio (Blend_ratio), as indicated by the following equation:

$$\text{Exposure\_telescopic\_final} = \text{Exposure\_wide} \times \text{Blend\_ratio} + \text{Exposure\_telescopic} \times (1 - \text{Blend\_ratio})$$

A computer usable medium according to a fifth embodiment of the present disclosure is a medium storing a software for causing a computer to implement the method for controlling an exposure level, the method including the above-mentioned steps shown in FIG. 3. Further, a computer usable medium according to a sixth embodiment of the present disclosure is a medium storing a software for causing a computer to implement the method for controlling an exposure level, the method including the above-mentioned steps shown in FIG. 5.

According to the present disclosure, an exposure level of a digitally zoomed image or a telescopic image can be appropriately controlled.

For example, when the digitally zoomed image is occupied by the black/white object only and is not under dark/bright condition, the object can be appropriately displayed as a sufficiently black/white object.

Further, for another example, when the digitally zoomed image or the telescopic image is occupied by a bright object (for example, the outside of a window) and is not under bright condition, the object can be appropriately displayed showing details.

In the description of embodiments of the present disclosure, it is to be understood that terms such as "central", "longitudinal", "transverse", "length", "width", "thickness", "upper", "lower", "front", "rear", "back", "left", "right", "vertical", "horizontal", "top", "bottom", "inner", "outer", "clockwise" and "counterclockwise" should be construed to refer to the orientation or the position as described or as shown in the drawings in discussion. These relative terms are only used to simplify the description of the present disclosure, and do not indicate or imply that the device or element referred to must have a particular orientation, or must be constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, a feature defined as "first" and "second" may comprise one or more of this feature. In the description of the present disclosure, "a plurality of" means "two or more than two", unless otherwise specified.

In the description of embodiments of the present disclosure, unless specified or limited otherwise, the terms "mounted", "connected", "coupled" and the like are used broadly, and may be, for example, fixed connections, detachable connections, or integral connections; may also be mechanical or electrical connections; may also be direct connections or indirect connections via intervening structures; may also be inner communications of two elements which can be understood by those skilled in the art according to specific situations.

In the embodiments of the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are in contact via an additional feature formed therebetween. Furthermore, a first feature "on", "above" or "on top of" a second feature may include an embodiment in which the first feature is orthogonally or obliquely "on", "above" or "on top of" the second feature, or just means that the first feature is at a height higher than that of the second feature; while a first feature "below", "under" or "on bottom of" a second feature may include an embodiment in which the first feature is orthogonally or obliquely "below", "under" or "on bottom of" the second feature, or just means that the first feature is at a height lower than that of the second feature.

Various embodiments and examples are provided in the above description to implement different structures of the present disclosure. In order to simplify the present disclosure, certain elements and settings are described above. However, these elements and settings are only by way of example and are not intended to limit the present disclosure. In addition, reference numbers and/or reference letters may be repeated in different examples in the present disclosure. This repetition is for the purpose of simplification and clarity and does not refer to relations between different embodiments and/or settings. Furthermore, examples of different processes and materials are provided in the present disclosure. However, it should be appreciated by those skilled in the art that other processes and/or materials may also be applied.

Reference throughout this specification to "an embodiment", "some embodiments", "an exemplary embodiment", "an example", "a specific example" or "some examples" means that a particular feature, structure, material, or characteristics described in connection with the embodiment or example is included in at least one embodiment or example of the present disclosure. Thus, the appearance of the above phrases throughout this specification does not necessarily refer to the same embodiment or example of the present disclosure. Furthermore, the particular features, structures, materials, or characteristics may be combined in any suitable manner in one or more embodiments or examples.

Any process or method described in a flowchart or described herein in other ways may be understood to include one or more modules, segments or portions of codes of executable instructions for achieving specific logical functions or steps in the process, and that the scope of a preferred embodiment of the present disclosure includes other implementations, in which it should be understood by those skilled in the art that functions may be implemented in a sequence other than the sequences shown or discussed, including in a substantially identical sequence or in an opposite sequence.

The logic and/or step described in other manners herein or shown in a flow chart, for example, a particular sequence table of executable instructions for realizing the logical function, may be specifically achieved in any computer readable medium to be used by the instructions execution system, device or equipment (such as a system based on computers, a system comprising processors or other systems capable of obtaining instructions from the instructions execution system, device and equipment executing the instructions), or to be used in combination with the instructions execution system, device or equipment. As to the specification, "computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, since, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instructions execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with the use of programs. The programs may be stored in a computer readable storage medium and comprise one or a combination of the steps in the method embodiments of the present disclosure when run on a computer.

In addition, each function cell of the embodiments of the present disclosure may be integrated in a processing module, or these cells may be physically separate, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although embodiments of the present disclosure have been shown and described, it should be appreciated by those skilled in the art that the embodiments are explanatory and cannot be construed to limit the present disclosure, and changes, modifications, alternatives and variations can be made in the embodiments without departing from the scope of the present disclosure.

What is claimed is:

1. A method for controlling an exposure level for a digitally zoomed image included in a wide angle image, the method comprising:
acquiring first statistics concerning a luminance level in the digitally zoomed image and second statistics concerning a luminance level in the wide angle image;
estimating whether an exposure level for the digitally zoomed image should be compensated, by using the first statistics and the second statistics; and
determining a target exposure level for the digitally zoomed image based on the estimation result.

2. The method according to claim 1, wherein the estimating whether the exposure level for the digitally zoomed image should be compensated, comprises:
estimating, by using the first statistics and the second statistics, whether an object in the digitally zoomed image is black or a shooting condition is dark, or the object is white or the shooting condition is bright.

3. The method according to claim 2, further comprising:
determining that the exposure level for the digitally zoomed image should be compensated, in response to determining the object is black and the shooting condition is not dark; or
determining that the exposure level for the digitally zoomed image should be compensated, in response to determining the object is white and the shooting condition is not bright.

4. The method according to claim 1, wherein the estimating whether the exposure level for the digitally zoomed image should be compensated, comprises:
calculating an exposure level difference between the second statistics and a third statistics concerning a luminance level in an area, corresponding to the digitally zoomed image, included in the wide angle image; and
determining that the exposure level for the digitally zoomed image should be compensated when the exposure level difference is lower than a predetermined value.

5. The method according to claim 4 wherein when determining that the exposure level for the digitally zoomed image should be compensated, the determining the target exposure level for the digitally zoomed image based on the estimation result, comprises:
determining a blend ratio based on the exposure level difference; and
blending an exposure level indicated by the first statistics with an exposure level indicated by the second statistics by using the blend ratio to thereby acquire the target exposure level.

6. The method according to claim 5, wherein the blend ratio is a preset value which is greater than 0 and equal to or smaller than 1 when the exposure level difference is smaller than a predetermined threshold, wherein the predetermined threshold is less than the predetermined value; and
wherein the blend ratio is a value which is smaller than the preset value and greater than 0 and decreases with the increasing exposure level difference, when the exposure level difference is equal to or greater than the predetermined threshold and smaller than the predetermined value.

7. The method according to claim 1, wherein the determining the target exposure level for the digitally zoomed image based on the estimation result, comprises:
determining, in response to determining that the exposure level for the digitally zoomed image should be compensated, the target exposure level for the digitally zoomed image based on blending an exposure level indicated by the first statistics with an exposure level indicated by the second statistics by using the following equation:

$$\text{Exposure\_zoomed\_final} = \text{Exposure\_wide} \times \text{Blend\_ratio} + \text{Exposure\_zoomed} \times (1 - \text{Blend\_ratio})$$

wherein
Exposure_zoomed_final is the target exposure level for the digitally zoomed image;
Exposure_wide is the exposure level for the wide angle image;
Exposure_zoomed is the exposure level for the digitally zoomed image; and
Blend_ratio is a blend ratio.

8. A method for controlling an exposure level for a telescopic image from a telescopic camera, the method comprising:
acquiring first statistics concerning a luminance level in an area, corresponding to the telescopic image, included in a wide angle image, and second statistics concerning a luminance level in the wide angle image;
estimating whether an exposure level for the telescopic image should be compensated, by using the first statistics and the second statistics; and
determining a target exposure level for the telescopic image based on the estimation result.

9. The method according to claim 8, wherein the estimating whether the exposure level for the telescopic image should be compensated, comprises:
estimating, by using the first statistics and the second statistics, whether an object is black or a shooting condition is dark, or the object is white or the shooting condition is bright.

10. The method according to claim 9, further comprising:
determining that the exposure level for the telescopic image should be compensated, in response to determining the object is black and the shooting condition is not dark; or
determining that the exposure level for the telescopic image should be compensated, in response to determining the object is white and the shooting condition is not bright.

11. The method according to claim 8, wherein, the estimating whether the exposure level for the telescopic image should be compensated, comprises:
calculating an exposure level difference between the first statistics and the second statistics; and
determining that the exposure level for the telescopic image should be compensated when the exposure level difference is lower than a predetermined value.

12. The method according to claim 11, wherein the determining the target exposure level for the telescopic image based on the estimation result, comprises:
determining a blend ratio based on the exposure level difference;
acquiring a third statistics concerning a luminance level in the telescopic image; and blending an exposure level indicated by the first statistics with an exposure level indicated by the third statistics by using the blend ratio to thereby determine the target exposure level.

13. The method according to claim 12, wherein the blend ratio is a preset value which is greater than 0 and equal to or smaller than 1 when the exposure level difference is smaller than a predetermined threshold, wherein the predetermined threshold is less than the predetermined value; and wherein the blend ratio is a value which is smaller than the preset value and greater than 0 and decreases with the increasing exposure level difference, when the exposure level difference is equal to or greater than the predetermined threshold and smaller than the predetermined value.

14. The method according to claim 8, wherein the determining the target exposure level for the telescopic image based on the estimation result, comprises:

acquiring a third statistics concerning a luminance level in the telescopic image; and determining, in response to determining that the exposure level for the telescopic image should be compensated, the target exposure level for the telescopic image based on blending an exposure level indicated by the first statistics with an exposure level indicated by the third statistics by using the following equation:

$$\text{Exposure\_telescopic\_final} = \text{Exposure\_wide} \times \text{Blend\_ratio} + \text{Exposure\_telescopic} \times (1 - \text{Blend\_ratio})$$

wherein

Exposure_telescopic_final is the final exposure level for the telescopic image;

Exposure_wide is the exposure level for the wide angle image;

Exposure_telescopic is the exposure level for the telescopic image; and

Blend_ratio is a blend ratio.

15. A device for controlling an exposure level, comprising:

at least one camera having a zoom function, configured to acquire a zoomed image and a wide angle image comprising the zoomed image, wherein the at least one camera is further configured to acquire first statistics concerning a luminance level in the wide angle image, second statistics concerning a luminance level in an area, corresponding to the zoomed image, included in the wide angle image, and third statistics concerning a luminance level in the zoomed image; and a processor configured to determine a target exposure level for the zoomed image based on the first statistics, the second statistics, and the third statistics.

16. The device according to claim 15, wherein the at least one camera comprises a wide angle camera having a digital zoom function, the wide angle camera is configured to perform the digital zoom function to thereby acquire the zoomed image.

17. The device according to claim 15, wherein the at least one camera comprises a wide angle camera and a telescopic camera having an optical zoom function, the wide angle camera is configured to acquire the wide angle image, the first statistics and the second statistics, and the telescopic camera is configured to perform the optical zoom function to thereby acquire the zoomed image and the third statistics.

18. The device according to claim 17, wherein the processor is configured to:

estimate, by using the first statistics and the second statistics, whether an object in the zoomed image is black or a shooting condition is dark, or the object is white or the shooting condition is bright; and determine that the exposure level for the zoomed image should be compensated, in response to determining the object is black and the shooting condition is not dark, or the object is white and the shooting condition is not bright.

19. The device according to claim 15, wherein the processor is configured to:

calculate an exposure level difference between an exposure level indicated by the first statistics and an exposure level indicated by the second statistics; and determine a blend ratio having a value which varies depending on the exposure level difference;

blend, in response to the exposure level difference is lower than a predetermined value, an exposure level indicated by the first statistic and an exposure level indicated by the third statistic with the blend ratio to thereby determine the target exposure level for the zoomed image.

20. The device according to claim 19, wherein the processor is configured to:

blend the exposure level indicated by the first statistic and the exposure level indicated by the third statistic with the blend ratio by using the following equation:

$$\text{Exposure\_zoomed\_final} = \text{Exposure\_wide} \times \text{Blend\_ratio} + \text{Exposure\_zoomed} \times (1 - \text{Blend\_ratio})$$

wherein

Exposure_zoomed_final is the target exposure level for the zoomed image;

Exposure_wide is the exposure level for the wide angle image;

Exposure_zoomed is the exposure level for the zoomed image; and

Blend_ratio is the blend ratio.

* * * * *